United States Patent [19]

Ricker

[11] Patent Number: 5,223,841
[45] Date of Patent: Jun. 29, 1993

[54] CALIBRATION METHOD AND APPARATUS FOR COLLECTING THE OUTPUT OF AN ARRAY OF DETECTOR CELLS

[75] Inventor: Alton R. Ricker, Orange Park, Fla.

[73] Assignee: The United States of America as represented by the Secretary of the Navy, Washington, D.C.

[21] Appl. No.: 906,096

[22] Filed: Jun. 29, 1992

[51] Int. Cl.⁵ .............................................. G01S 7/40
[52] U.S. Cl. ...................................... 342/174; 342/54
[58] Field of Search ................. 342/174, 173, 169, 54

[56] References Cited

U.S. PATENT DOCUMENTS

| | | | |
|---|---|---|---|
| H173 | 12/1986 | Claborn et al. | 342/372 |
| 3,924,341 | 12/1975 | Edelsohn | 342/171 |
| 4,176,354 | 11/1979 | Hsiao et al. | 342/173 |
| 4,810,973 | 3/1989 | Kurtz | 330/129 |
| 4,833,418 | 5/1989 | Quintus et al. | 330/9 |
| 4,876,489 | 10/1989 | Cawthorne | 342/383 |
| 4,924,232 | 5/1990 | Hudson et al. | 342/174 |
| 4,926,186 | 5/1990 | Kelly et al. | 342/360 |
| 4,952,940 | 8/1990 | Kuepfer | 342/174 |
| 4,954,834 | 9/1990 | Buck | 342/360 |
| 4,969,059 | 11/1990 | Volz et al. | 360/78.04 |
| 5,003,314 | 3/1991 | Berkowitz et al. | 342/372 |
| 5,027,127 | 6/1991 | Shnitkin et al. | 342/372 |
| 5,036,333 | 7/1991 | Chapman et al. | 342/370 |
| 5,056,051 | 10/1991 | Tkalcevic | 342/165 X |
| 5,063,529 | 11/1991 | Chapoton | 342/174 X |
| 5,107,445 | 4/1992 | Jensen et al. | 364/525 |
| 5,124,708 | 6/1992 | Mackes et al. | 342/174 |

Primary Examiner—John B. Sotomayor
Attorney, Agent, or Firm—Thomas E. McDonnell; Edward F. Miles

[57] ABSTRACT

A parallel to serial converter converts parallel detected signals output from a linear array of photodetector cells to an uncorrected serial signal. A comparator compares the uncorrected serial signal from the parallel to serial converter with a previous offset stored in a shift register. An offset difference output from the comparator is added to a previous offset output from the shift register to provide a new offset for input to the shift register. An operate adder finally provides a corrected serial signal by adding the uncorrected serial signal from the parallel to serial converter and the new offset output from the learn adder.

30 Claims, 4 Drawing Sheets

CALIBRATION METHOD AND APPARATUS FOR COLLECTING THE OUTPUT OF AN ARRAY OF DETECTOR CELLS

BACKGROUND OF THE INVENTION

1. Field of the Invention

The present invention relates generally to a method and apparatus for calibrating detector cells and, more particularly, to a method and apparatus for storing and updating offsets for correction of a detected signal from photodetector cells.

2. Description of the Related Art

In a linear array of photodetector cells, each photodetector cell has a unique DC offset due to manufacturing differences, ageing and environmental factors such as temperature. Therefore, each photodetector cell must be individually calibrated to correct for the DC offset. Calibration of the photodetector cells must be quick and accurate when data from an antenna is being serially quantized from a linear array of a photodetector cells. Furthermore, the calibration must have an ability to accurately correct for only true DC offset errors by rejection of spurious noise and spikes which do not represent those factors such as manufacturing differences, ageing or steady state environmental conditions.

Previously, a one-time offset measurement of each photodetector cell in an array was made and the offset stored in a look-up table. A software correction was then performed on every pulse measurement. This approach slowed down an already overloaded processor and failed to provide for correction of photodetector cell DC offsets which change over time, such as instabilities due to temperature variations. Furthermore, the offset corrections using hardware addressed by cell number was very complicated.

SUMMARY OF THE INVENTION

It is therefore an object of the present invention to individually calibrate detector cells.

It is another object of the present invention to calibrate and correct detected signals serially provided from a linear array of detector cells.

Another object of the present invention is to quickly and accurately correct for DC offsets in a plurality of photodetector cells by processing data in the same order or sequence for every frame read out of a detector cell array.

A further object of the present invention is to perform calibration and correction while rejecting spurious noise and spikes by obtaining only a one step change at a time of an offset value.

A still further object of the present invention is to calibrate and correct a serial output of an array of detector cells for factors such as manufacturing differences, ageing or environmental conditions such as temperature.

Yet another object of the present invention is to provide a method and apparatus for determining and storing in a first-in-first-out shift register an offset value to correct the output of a detector cell.

In order to achieve the foregoing and other objects, in accordance with the purposes of the present invention as described herein, parallel detected signals output from a linear array of detector cells in a dark current condition are converted to an uncorrected serial signal by a parallel to serial converter. A comparator compares the uncorrected (dark current) serial signal from the parallel to serial converter with a previous offset stored in a shift register. An offset difference output from the comparator is added to a previous offset output from the shift register to provide a new offset for input to the shift register. An operate adder finally provides a corrected serial signal by adding the uncorrected serial signal from the parallel to serial converter and the new offset output from the learn adder.

The present invention operates in two different modes, a learn mode and an operate mode. When in the learn mode, the comparator outputs an offset difference, so that the new offset can be fed back to the shift register. However, in the operate mode, the comparator outputs a zero offset difference, so that only the offsets stored in the shift register are used for correction of the uncorrected serial data by the operate adder to finally generate the corrected serial signal. The comparator outputs an offset difference within a predetermined range of values. Preferably, the offset difference is one of $-1$, $0$ or $+1$. Thus, by limiting the offset difference to a predetermined range of values, spurious noise and spikes will not radically change the offset stored in the shift register. Only a continuous offset, that is, an offset that lasts for more than one conversion cycle, as opposed to an instantaneous spike or the like, will allow the offset stored in the shift register to ramp up.

The above-mentioned and other objects and features of the present invention will become more apparent from the following description when read in conjunction with the accompanying drawings. However, the drawings and descriptions are merely illustrative in nature and not restrictive.

DESCRIPTION OF THE PREFERRED EMBODIMENTS

Figure 1:
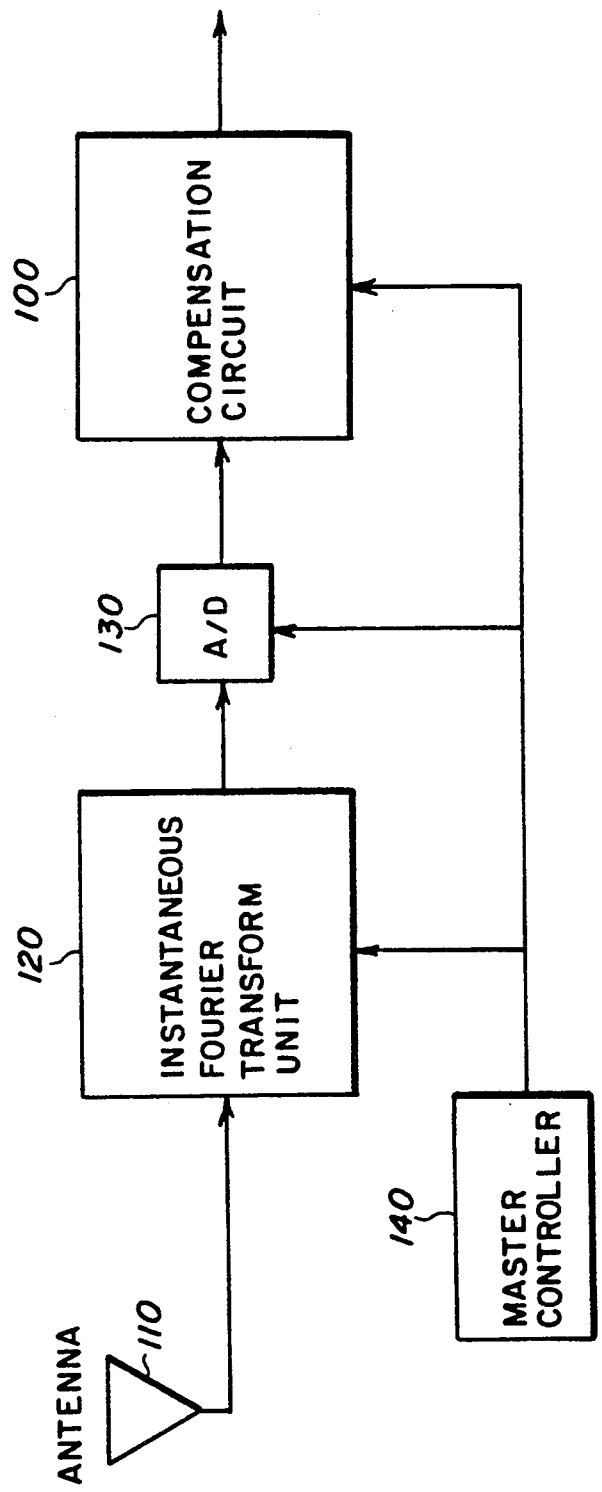
FIG. 1 is a system block diagram illustrating an embodiment having a compensation circuit of the present invention connected to an array of photodetector cells for performing an instantaneous Fourier transform on the output of an antenna.

FIG. 1 illustrates the compensation circuit 100 connected to an antenna 110 via an instantaneous Fourier transform unit 120. The output of the instantaneous Fourier transform unit 120 is an uncorrected serial data signal which passes through an analog to digital converter (A/D) 130 before correction in the compensation circuit 100. A master controller 140 provides control and clock signals to the instantaneous Fourier transform unit 140, the analog to digital converter 130 and the compensation circuit 100. The controlling clock signal is used to control the output of the uncorrected serial signal by the instantaneous Fourier transform unit 100, to clock the analog to digital converter 130 and to provide a clock for components of the compensation circuit 100 such as a shift register. Furthermore, the master controller 140 provides the controlling clock signal to the compensation circuit 100 to alternatingly control between the learn mode and the operate mode. In the learn mode, offsets for each of the photodetector cells are stored in the compensation circuit 100 and, in the operate mode, the stored offsets are used to correct the uncorrected serial signals output from the instantaneous Fourier transform unit 100. Preferably, the learn mode is selected by the master controller 140 when no demand for corrected serial data exists, such as during the retrace period of a scan of the cells of an array or, alternatively, when a plurality of compensation circuits are multiplexed and a continuous corrected output signal is not required.

Figure 2:
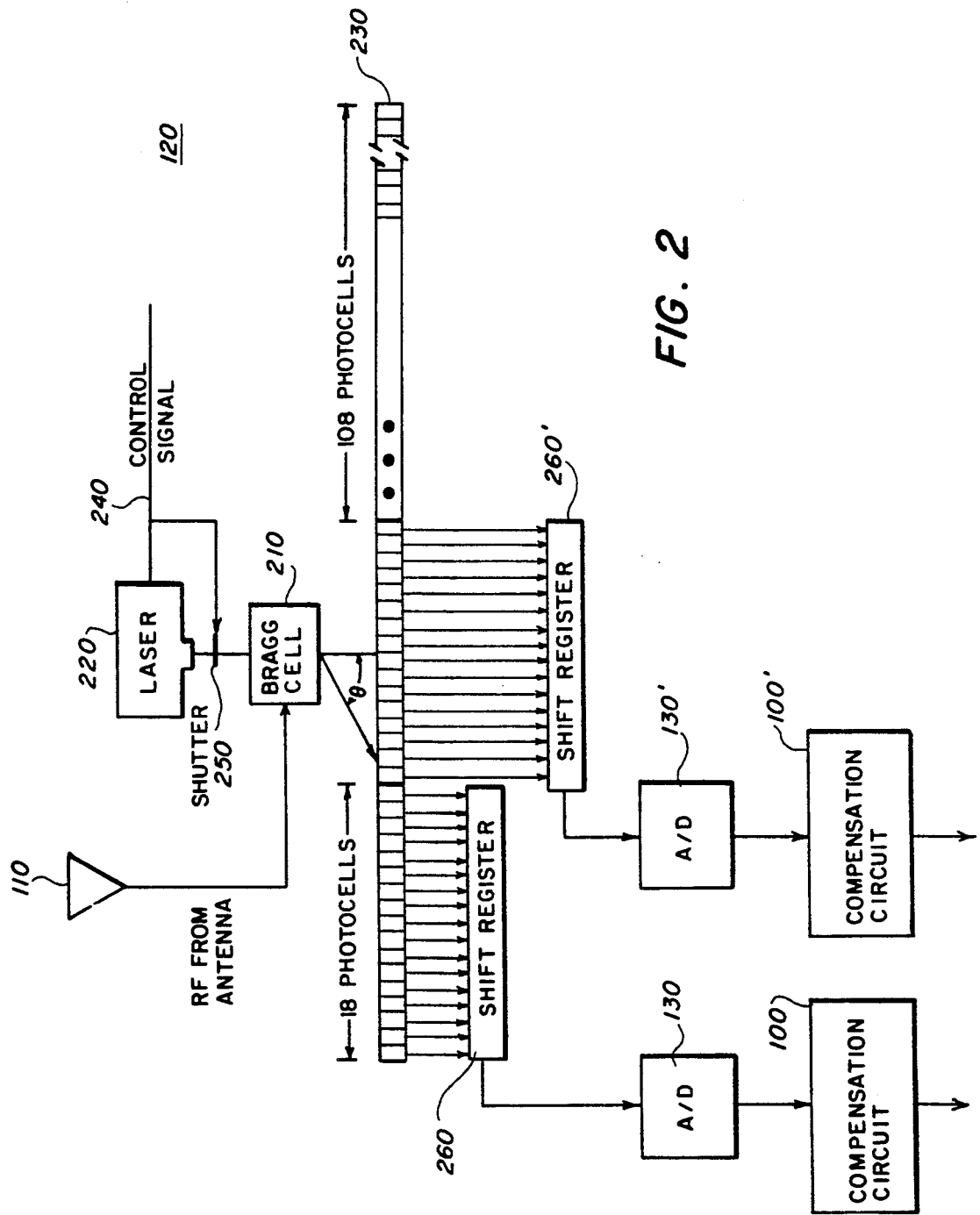
FIG. 2 is a detailed block diagram illustrating details of the instantaneous Fourier transform unit 120 illustrated in FIG. 1 as connected to the compensation circuit 100 of the present invention.

FIG. 2 illustrates details of the instantaneous Fourier transform unit 120 which is connected between the antenna 110 and the analog to digital converter 130 and the compensation circuit 100. An RF signal from the antenna 110 is connected to control a Bragg cell 210 which causes a laser beam from a laser 220 to disperse at an angle $\theta$. Thus, responsive to the RF signal from antenna 110, the laser beam from laser 220 is dispersed to energize one or more of a plurality of photocells in a linear array 230.

The laser beam output is modulated based on a control signal 240 from the master controller of FIG. 1. The control signal 240 can modulate a shutter 250 disposed between the laser 220 and the Bragg cell 210 or, alternatively, the control signal 240 can electronically turn the laser on and off. In the learn mode, the control signal 240 will cause no light to be incident upon the photodetector cells of the linear array 230 so that their DC offsets can be measured under a dark current condition.

The linear array 230 preferably has 108 photodetector cells. The 108 photodetector cells are preferably broken up into six blocks of eighteen photocells each. Each block of eighteen photocells connects to a shift register 260 which stores the charges transferred from the photocells. For purposes of illustration, only shift registers 260 and 260' are shown. A compensation circuit 100 is associated with each shift register 260 via connection through an analog to digital converter (A/D) 130. The analog to digital converter 130 thus digitizes the charge signal from each shift register. Alternatively, a single compensation circuit 100 can process all 108 photocells if a single 108 element shift register 260 is used. However, a larger memory and faster circuits would be required for the compensation circuit 100 in order to handle all 108 photodetector cells with the same data throughput rate. Alternatively, if the data throughput rate is not as important, a single compensation circuit 100 could be multiplexed among the six shift registers 260 connected to each of the six blocks of eighteen photocells. It can be appreciated by those of skill in the art that any number of photocells can be used. However, preferably the number should be an easily divisible multiple for division into blocks 19 as in the preferred embodiment. Furthermore, a matrix array other than a linear array of photodetector cells can be used for applications other than the instantaneous Fourier transform performed in the preferred embodiment. For example, a matrix of CCD photodetectors or other appropriate imaging cells or radiant energy sensitive detector cells can be implemented using the compensation circuit 100 with an appropriate size shift register.

Figure 3:
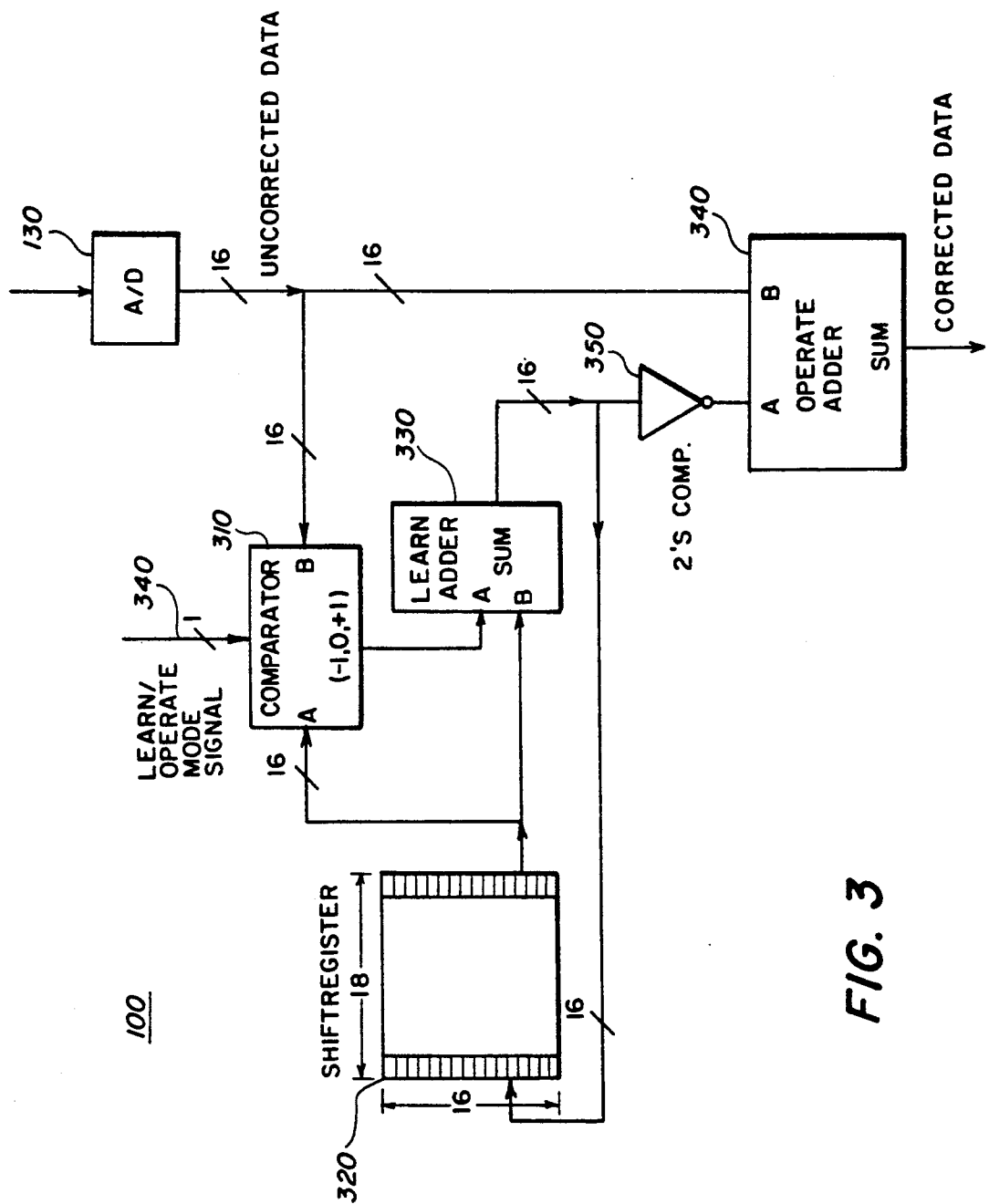
FIG. 3 is a detailed circuit block diagram illustrating an embodiment of the compensation circuit 100 of the present invention.

FIG. 3 illustrates the compensation circuit 100 of the present invention for receiving uncorrected serial data from the analog to digital converter 130 and producing corrected serial data as an output. The uncorrected serial data from the analog to digital converter 130 is preferably a sixteen bit digitized signal. Eighteen sixteen bit words are sequentially transmitted from the analog to digital converter 130. Each sixteen bit word corresponds to one of the eighteen photodetector cells in one of the six blocks of the linear array 230 in FIG. 2.

When in the learn mode, comparator 310 compares the uncorrected sixteen bit signal from the analog to digital converter 130 with a corresponding previous offset stored in shift register 320 for that detector cell to provide an offset difference to a learn adder 330. If the uncorrected sixteen bit serial signal corresponding to the newly measured DC offset for a given photodetector cell is smaller than a corresponding previous offset stored in the shift register 320, then a $-1$ offset difference is output by the comparator 310. This $-1$ offset difference is added in the learn adder 330 to the previous offset stored in the shift register 320 for a given photodetector cell. The new offset output by the learn adder 330 is then fed back to the input of the shift register 320 and replaces the previous offset. If the uncorrected sixteen bit signal corresponding to a newly measured DC offset for the given photodetector cell is greater than the corresponding previous offset stored in the shift register 320, then a $+1$ is added by learn adder 330 to the previous offset output of the shift register 320. The new offset output of the learn adder 330 is then, likewise, fed back to the input of the shift register 320 and replaces the previous offset corresponding to the given photodetector cell. If the uncorrected sixteen bit signal output by the analog to digital converter 130 is the same as the corresponding previous offset output by the shift register 320, then the offset shall remain unchanged and the comparator 310 outputs no value or 0 for the offset difference. Because the comparator 310 only outputs $+1, -1$ or 0 for the offset difference, only a one step change in the offset data stored in shift register 320 is made per calibration cycle. Therefore, large swings in the correction value resulting from occasional noise, spikes or cross talk is avoided. The offsets stored in the shift register 320 are thus effectively integrated over time by the compensation circuit 100. Accordingly, a simple circuit provides noise immunity for the compensation performed.

The shift register 320 is a first-in-first-out (FIFO) shift register that is sixteen bits wide and eighteen cells deep. The eighteen cells correspond to the eighteen photodetector cells in each of the six blocks of the linear array 230 in FIG. 2. Therefore, the size of the shift register corresponds to the number of photodetector cells in a corresponding sensing array. An advantage is provided by the fact that the photodetector cell data is always processed in the same order or sequence for every frame read out of the photodetector cell array 230. Therefore, a lookup table or complex addressing scheme for the offset correction data is not necessary. A shift register of any cell width is possible, and therefore, even large arrays can be accurately and quickly corrected by this simple compensation circuit of the present invention. As an alternative to a shift register, a sequentially addressable or sequentially readable memory which operates in a first-in-first-out mode can also be used.

The comparator 310 is responsive to the learn/operate mode signal 340 to determine operation in one of the learn mode or the operate mode. The learn/operate mode signal 340 is provided from the master controller 140 in FIG. 1. The compensation circuit 100 is periodically switched between the operate mode and the learn mode. In the learn mode, the array 230 in FIG. 2 is in a dark current condition and DC offsets can be measured to update the previous offsets for the photocells stored in shift register 320. The learn mode can occur during a down time such as during a retrace or refresh operation. A learn mode can also be periodically performed between read operations when a plurality of compensation circuits 100 are multiplexed.

When in the operate mode, the comparator 310 outputs a 0 for the offset difference to the learn adder 330. Therefore, the previous offset directly passes from the shift register 320 through the learn adder 330. The uncorrected serial data from the analog to digital converter 130 is thus added in an operate adder 340 to a two's complement of a given photodetector cell's corresponding offset from the shift register 320. The two's complement is provided by an inverter unit 350. During the operate mode, a corrected serial data stream of eighteen sixteen bit words is output from the operate adder 340.

The operate adder 340 preferably is constructed using three 74F283 integrated circuits and the inverter unit 350 preferably is constructed from a 74F04 integrated circuit. However, a subtractor or other microprocessor can be used in place of the operate adder 340 and the inverter 350. Additionally, the comparator 310 can be made from three 74F85 integrated circuits and the learn adder 330 can also be made from two 74F283 integrated circuits. The shift register 320 can be made from sixteen 74F164 integrated circuits. The above-described numbers of integrated circuits will provide another embodiment of the present invention where eight bit words are used for each of sixteen detector cells in each block of the array 230. Other sizes and multiples are possible, as discussed above. Furthermore, the above-described circuits can be implemented on a custom or application specific integrated circuit chip, so that array lengths of hundreds of cells can be calibrated in real time using a single compensation circuit. Such a custom integrated circuit chip would require no handshake controls and little multiplexing or input-output signals and therefore provide for a very simple interface with data analyzing devices for receiving the corrected serial signals from the compensation circuit. Furthermore, a custom integrated circuit chip may provide the fastest data throughput rate, in part, because no multiplexing need be required.

Figure 4:
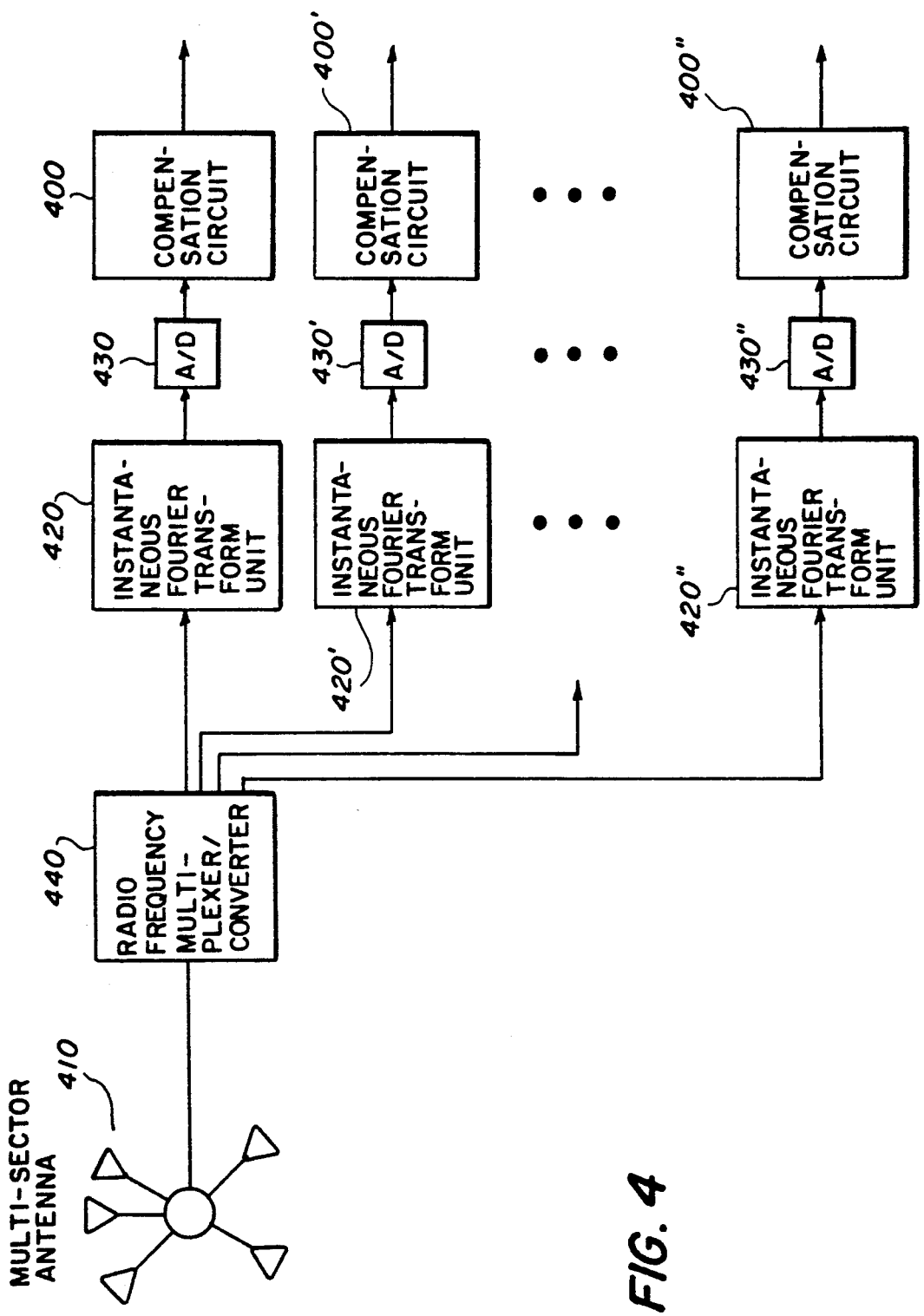
FIG. 4 is a system block diagram illustrating an embodiment having a plurality of compensation circuits coupled to a multisector antenna via a plurality of instantaneous Fourier transform units.

FIG. 4 illustrates an embodiment of the present invention wherein a multi-sector antenna 410 is connected to a plurality of compensation circuits 400 via a plurality of instantaneous Fourier transform units 420 and analog to digital converters (A/D) 430. A radio frequency multiplexer/converter 440 multiplexes the output of the multi-sector antenna 410 to provide a plurality of outputs to the plurality of instantaneous Fourier transform units 420. Within each instantaneous Fourier transform unit 420, a plurality of blocks of photodetector cells in an array such as array 230 in FIG. 2 can be provided. Therefore, a plurality of compensation circuits such as compensation circuits 100 and 100' in FIG. 2 may be provided for each of the instantaneous Fourier transform units 420 illustrated in FIG. 4. Accordingly, any number of compensation circuits can be provided and multiplexed to compensate for the DC offsets of the photodetector cells.

While the invention has been illustrated and described in detail in the drawings and foregoing description, it will be recognized that many changes and modifications will occur to 14 those skilled in the art. It is therefore intended, by the appended claims, to cover any such changes and modifications as fall within the true spirit and scope of the invention.

What is claimed is:

1. An apparatus for calibration in a learn mode and an operate mode of a linear array of detector cells, each of the detector cells providing one of a plurality of detected signals, comprising:
   a parallel to serial converter operatively connected to receive the plurality of detected signals from said array of detector cells and provide an uncorrected serial signal;
   a memory capable of sequentially holding a previous offset for each of said detector cells;
   a comparator operatively connected to compare the uncorrected serial signal from said parallel to serial converter and the previous offset from said memory when in the learn mode to provide an offset difference; and
   a learn adder operatively connected to add the offset difference from said comparator and the previous offset from said memory and provide a new offset and operatively connected to said memory to sequentially hold the new offset as the previous offset.

2. An apparatus according to claim 1, further comprising:
   an operate adder operatively connected to add the uncorrected serial signal from said parallel to serial converter and the new offset from said learn adder when in the operate mode to provide a corrected serial signal.

3. An apparatus according to claim 1, wherein said comparator limits the offset difference to a predetermined range of values.

4. An apparatus according to claim 3, wherein said comparator limits the offset difference to the predetermined range of plus and minus one bit.

5. An apparatus according to claim 3, wherein said comparator provides a zero offset difference when in the operate mode.

6. An apparatus according to claim 1, wherein said parallel to serial converter comprises a shift register and an analog to digital converter operatively connected to receive the plurality of detected signals from said array of cells and to provide the uncorrected serial signal to said comparator and said operate adder.

7. An apparatus according to claim 1, wherein said memory comprises one of a first-in-first-out memory and a shift register.

8. An apparatus according to claim 1, further comprising an instantaneous Fourier transform unit including
   a laser optically coupled with the linear array of detector cells; and
   a Bragg cell disposed between said laser and the linear array of detector cells.

9. An apparatus according to claim 8, further comprising an antenna operatively connected to said Bragg cell.

10. An apparatus for calibrating a linear array of detector cells wherein each of the detector cells provides one of a plurality of detected signals, comprising:

first means for serially providing the detected signals as an uncorrected serial signal; and second means for comparing the uncorrected serial signal with serially stored previous offsets to produce a difference used to provide a new offset for correction.

11. An apparatus according to claim 10, wherein said second means comprises:

memory means for sequentially holding the previous offset for each of the detector cells;

comparison means for comparing the uncorrected serial signal with the previous offset to provide the offset difference; and learn adder means for adding the offset difference and the previous offset to provide the new offset as the previous offset.

12. An apparatus according to claim 11, wherein said comparator means comprises means for comparing the uncorrected serial signal with a previous offset to provide an offset difference when in a learn mode, wherein said offset difference is limited to a predetermined range of values.

13. An apparatus according to claim 12, wherein said comparator means comprises means for limiting the offset difference to plus and minus one bit.

14. An apparatus according to claim 13, wherein said comparator means further comprises means for outputting zero as an offset difference when in an operate mode.

15. An apparatus according to claim 12, further comprising operate adder means for adding the uncorrected serial signal with the previous offset to provide an offset difference when in an operate mode.

16. An apparatus according to claim 2, wherein said memory means comprises one of a first-in-first-out memory and a shift register.

17. A method of calibrating a linear array of detector cells wherein each of the detector cells provides one of a plurality of detected signals, comprising the steps of:

(a) serially providing the detected signals to a comparator;

(b) comparing one of the detected signals serially provided in said step (a) with a previous offset to provide an offset difference;

(c) adding the offset difference and the previous offset to provide a new offset as the previous offset.

18. A method according to claim 17, further comprising the steps of:

(d) adding one of the detected signals serially provided in said step (a) with a previous offset to provide an offset difference when in an operate mode.

19. A method according to claim 18, further comprising the step of:

(e) sequentially storing in a memory a plurality of the new offsets to provide a plurality of the previous offsets corresponding to the detector cells.

20. A method according to claim 18, wherein said step (b) comprises the substeps of:

(b1) comparing one of the detected signals serially provided in said step (a) with a previous offset to provide an offset difference when in a learn mode, wherein said offset difference is limited to plus and minus one bit.

21. A detection system comprising:

means for receiving an input to said system;

means for detecting said input, said means for detecting comprising one or more detector cells;

means for providing the output of each of said one or more detector cells in the form of corresponding one or more binary outputs;

means for storing one or more binary offset correction values, one each of said values* corresponding to respective ones of said one or more binary outputs;

means for subtracting each of said one or more binary offset correction values from a corresponding one of said one or more binary outputs; and means for incrementing said one or more binary offset correction values, said means for incrementing comprising:

means for isolating said input from each of said one or more detector cells;

means for determining which of said one or more binary offset correction values is greater to or less than the corresponding one of said one or more binary outputs; and means for incrementing each of said one or more binary offset correction values by a preselected amount, said incrementing being by subtracting a preselected amount from each of those one of said binary offset correction values that are greater than the corresponding ones of said one or more binary outputs, and by adding said preselected amount to those one of said binary offset correction values that are less than the corresponding ones of said one or more binary outputs.

22. The system of claim 21, wherein said preselected amount is a binary 1.

23. The system of claim 21, wherein said means for providing is a parallel to serial converter adapted to receive in parallel each of said one or more binary outputs, and responsive thereto provide a serial signal corresponding to said one or more binary outputs.

24. The system of claim 21, wherein:

said one or more detector cells are respective one or more photodetecting charge coupled devices; and said means for receiving said input comprises a laser and a Bragg cell, wherein:

said laser and said Bragg cell are adapted to transduce said input into one or more modulated optical signals directed to corresponding ones of said one or more charge coupled devices, effective to produce said output of said one or more detector cells.

25. The system of claim 24, wherein said means for making each of said one or more inputs zero is a shutter adapted to selectively isolate light output from said laser to said Bragg cell.

26. The system of claim 22, wherein said means for providing is a parallel to serial converter adapted to receive in parallel each of said one or more binary outputs, and responsive thereto provide a serial signal corresponding to said one or more binary outputs.

27. The system of claim 26, wherein:

said one or more detector cells are respective one or more photodetecting charge coupled devices; and said means for receiving said corresponding one or more outputs comprises a laser; and a Bragg cell, wherein:

said laser and said Bragg cell are adapted to transduce said input into one or more modulated optical signals directed to corresponding ones of said one or more charge coupled devices, effective to produce said output of said one or more detector cells.

28. The system of claim 27, wherein said means for making each of said one or more inputs zero is a shutter adapted to selectively isolate light output from said laser to said Bragg cell.

29. The system of claim 21, wherein said means for incrementing is adapted to repeat said incrementing for a preselected number of times.

30. The system of claim 28, wherein said means for incrementing is adapted to repeat said incrementing for a preselected number of times.

* * * * *